Dec. 26, 1961  R. CLAAS  3,014,737
PICK-UP BALER WITH PIVOTABLE DRAWBAR
Filed Feb. 18, 1960  2 Sheets-Sheet 1

Inventor:
Reinhold Claas
by Richards & Geier
ATTORNEYS

Inventor:
Reinhold Claas

United States Patent Office 3,014,737
Patented Dec. 26, 1961

3,014,737
PICK-UP BALER WITH PIVOTABLE DRAWBAR
Reinhold Claas, August Claas Strasse 64,
Harsewinkel, Germany
Filed Feb. 18, 1960, Ser. No. 9,606
Claims priority, application Germany Feb. 18, 1959
1 Claim. (Cl. 280—462)

The present invention relates to improvements in pick-up balers for hay, straw, and the like, and more particularly to a drawbar for such a baler for hitching the same to a tractor.

It is the general object of the present invention to provide a drawbar for a pick-up baler which is made of a pivotable structure so as to permit it to be adjusted to different positions to permit the baler to be moved along a road or a field in the inoperative position or to be adjusted to the operative position.

For attaining this object, the drawbar may be pivoted in a horizontal direction in order to make the width of the tractor and pick-up baler as narrow as possible when in the inoperative or transporting position so that the two vehicles together will take up the least possible space on a road, and it may also be pivoted in a vertical direction in order to permit the hitching point of the drawbar to be adjusted to the proper level relative to the pick-up mechanism of the baler.

For the latter purpose it is already known to provide the drawbar of a pick-up baler with a supporting jack which permits the drawbar on the baler while unhitched from the tractor to be braced against the ground and then to be adjusted to a suitable level for hitching the baler either in the transporting or operative position to a tractor.

It is more specifically the object of the present invention to provide a pivotable drawbar for a pick-up baler of a structural design which permits the drawbar to be pivoted in horizontal and vertical directions and such pivotal adjustments to be carried out in a very simple manner so that no more than one man will be required to operate the pick-up baler. This may be attained essentially by making the drawbar of two parts or sections, by mounting it on the baler so as to be pivotable in its entirety in a horizontal direction about a vertical axis relative to the baler, and by mounting the front section so as to be pivotable about a horizontal axis on the rear section.

The invention is preferably carried out by combining a jack or the like of a type known as such with the new drawbar, the two parts of which are pivotable relative to each other and are adapted to be fixed in different pivoting positions. Although the invention may be applied in a variety of different embodiments, the preferred embodiment consists of a housing to which a supporting jack is rigidly secured and which, in turn, is rigidly secured to the frame of the baler. This housing is adapted to receive one end of the two-part drawbar which is pivotable therein about a bolt to different positions and may be secured in one or the other of these positions by a locking bolt. At the point of separation of the two parts of the drawbar, which is disposed substantially at the center of its entire length, the rear end of the front part is preferably bifurcated by being provided with two opposite connecting members between which the rear part of the drawbar is inserted and pivotable about a horizontal bolt which is passed through corresponding bores in the free ends of the connecting members and the front end of the rear part of the drawbar.

The desired adjustment of the pick-up baler which is hitched to a tractor may be carried out by first operating the hand crank of the supporting jack to pivot the baler and the part of the drawbar thereon to the desired angle. After the adjustment has been made, the pivotable connection between the two parts of the drawbar should, however, be locked, for which purpose a pair of arms or brackets are rigidly secured to each of the spaced ends of the two parts of the drawbar and at an angle to the axes thereof. The free ends of these two pairs of arms are connected to each other by a link which is pivotably secured to one pair of these arms and adapted to be pivotably connected to the other pair of arms in a plurality of different positions by means of a connecting bolt passing through coinciding bores in the two arms of the latter pair and through one of a series of bores in the intermediate connecting link. The particular bore in the connecting link into which the connecting bolt is inserted depends upon the angle to which the two parts of the drawbar are to be adjusted relative to each other, and when the connecting pin is inserted therein, it will secure the two parts in the respective adjusted position. This adjustment is carried out while the front end of the part of the drawbar which is secured to the baler is braced on the ground at the desired level by means of the supporting jack. By this functional cooperation of the supporting jack with the pivotable two-part drawbar it is thus easily possible for a single person to hitch the pick-up baler to a tractor and to adjust the pick-up mechanism to any desired position relative to the ground.

These objects, features, and advantages of the present invention will also appear from the following detailed description of one preferred embodiment thereof, particularly when the same is read with reference to the accompanying diagrammatical drawings, in which—

FIGURE 4 shows a plan view, partly in cross section of the means according to FIGURE 3; while

Figure 1:
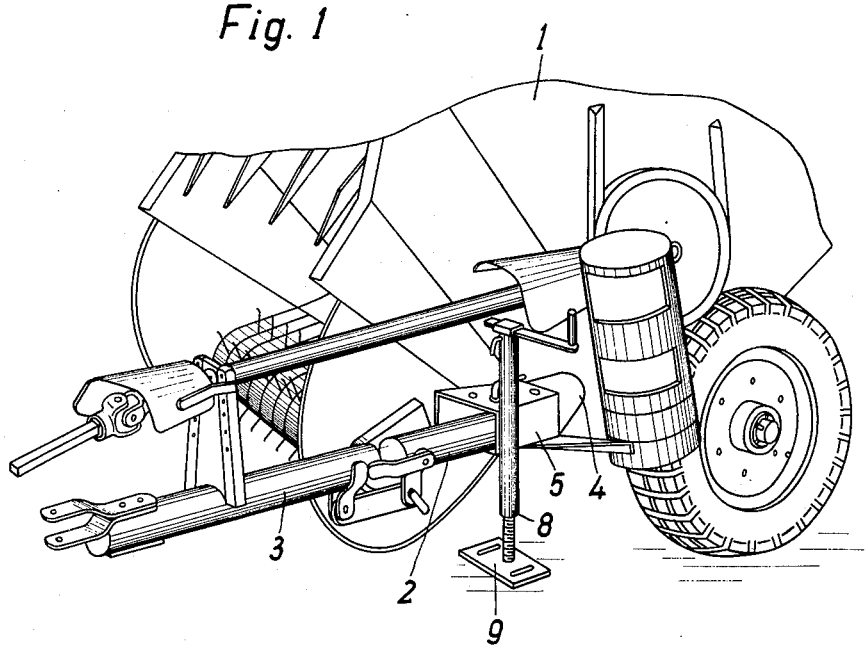
FIGURE 1 shows a perspective view of the drawbar according to the invention attached to a pick-up baler of which only a part is shown.
Figure 2:
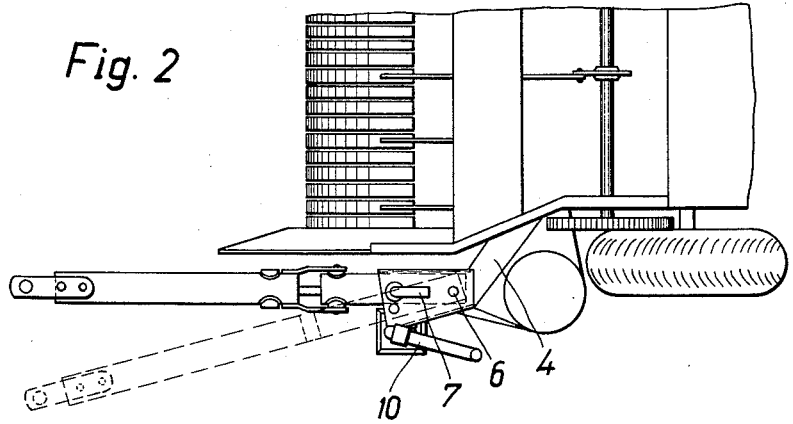
FIGURE 2 shows a plan view of FIGURE 1.
Figure 3:
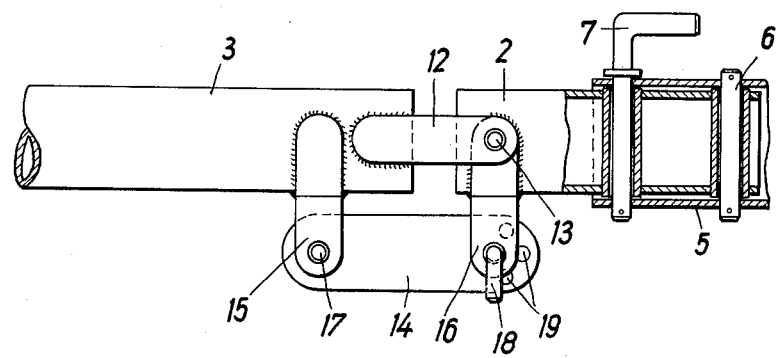
FIGURE 3 shows a side view, partly in cross section, of the means for pivotably mounting the drawbar on the pick-up baler.
Figure 4:
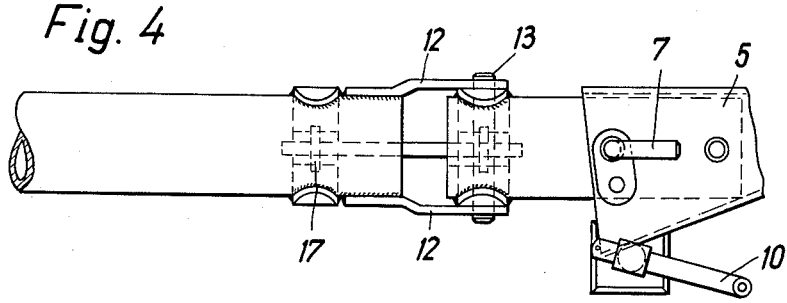
Figure 5:
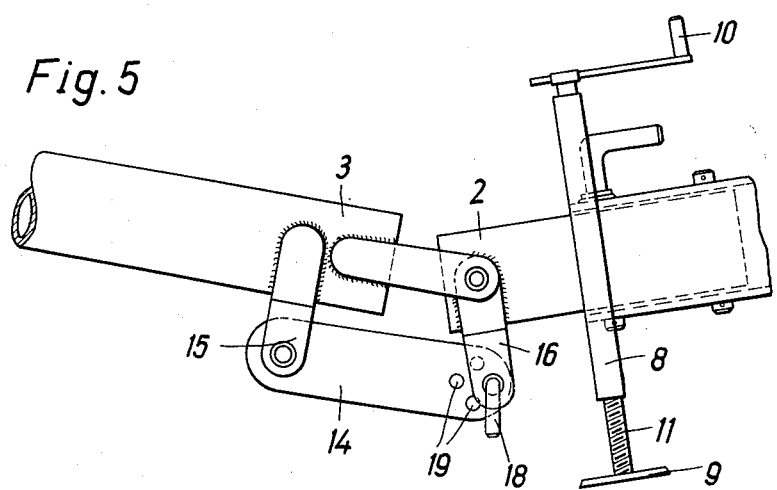
FIGURE 5 shows a side view of the two-part drawbar in one of the different positions of adjustment.

As illustrated in the drawings, the pick-up baler 1 is equipped with a drawbar for attaching the press to a tractor, not shown. This drawbar consists according to the invention of two bar sections 2 and 3 and both of these sections together are pivotable in the horizontal and vertical directions. For this purpose, bar 2 may be inserted into a box-shaped housing 5 which is rigidly secured to the frame 4 of press 1 and in which bar 2 is removably secured by means of a bolt 6 about which it is pivotable to different positions relative to baler 1 in a horizontal direction. A locking bolt 7 serves to secure bar 2 in the respective selected position. A jack 8 which is rigidly secured to housing 5 and thus also to frame 4 of the baler permits the baler when not attached to a tractor to be braced against the ground by means of a plate 9 on the lower end of the jack. By means of a handcrank 10 it is further possible to turn a threaded spindle 11 to pivot bar 2 together with baler 1 in a vertical direction. Bars 2 and 3 are connected to each other by a pair of brackets 12 which are secured at opposite sides to bar 3 and are pivotably connected by a bolt 13 to bar 2. Each bar 2 and 3 further has a pair of brackets 15 and 16 rigidly secured thereto, extending at substantially right angles to the axes of bars 2 and 3. These brackets 15 and 16 are connected to each other by a link member 14 which is pivotably mounted on brackets 15 on a pivot pin 17, while a locking bolt 18 is inserted into coinciding bores in brackets 16 and into one of several bores 19 in link member 14 to secure the two sections 2 and 3 of the drawbar rigidly to each other in the respective adjusted position. After the drawbar has been adjusted, the base plate 9 of jack 8 is wound upwardly by crank 10 to release the drawbar from the ground and to permit the baler to be hitched to a tractor.

Although my invention has been illustrated and described with reference to the preferred embodiment thereof, I wish to have it understood that it is in no way limited to the details of such embodiment, but is capable of numerous modifications within the scope of the appended claim.

Having thus fully disclosed my invention, what I claim is:

A drawbar for hitching a baler to a tractor, said drawbar comprising a front part having front and rear ends, a rear part spaced from said front part, a horizontal bolt carried by the rear end of said front part, two brackets carried by said bolt and firmly embracing a front end of said rear part, whereby said brackets support said front and rear parts in horizontal alinement with each other and whereby said rear part may pivot vertically relatively to said front part, two vertical brackets carried by the rear end of the front part and the front end of the rear part, respectively, a link, a pivot pin connecting one end of said link with one of said brackets, a locking bolt connecting the other end of said link with the other one of said brackets, said link having a plurality of bores adjacent said other end thereof, said locking bolt fitting into any one of said bores for securing said front and rear parts in one of a plurality of relative angular positions, a baler-supporting housing, a supporting jack rigidly connected to said housing, the front end of said front part extending into said housing, a vertical bolt extending through said housing and pivotally supporting said front end of the front part, whereby the front and rear parts are jointly pivoted horizontally about said bolt, and a locking bolt carried by said housing for securing said front part in one of a plurality of angular positions.

References Cited in the file of this patent

UNITED STATES PATENTS

| | | |
|---|---|---|
| 2,277,900 | Ball | Mar. 31, 1942 |
| 2,597,220 | Appel | May 20, 1952 |
| 2,665,144 | Birdwell | Jan. 5, 1954 |
| 2,709,085 | Stueland | May 24, 1955 |
| 2,924,466 | Johnson | Feb. 9, 1960 |